SWEPT FREQUENCY SYNTHESIZER WITH FREQUENCY MARKER GENERATION CAPABILITY
Filed May 31, 1968
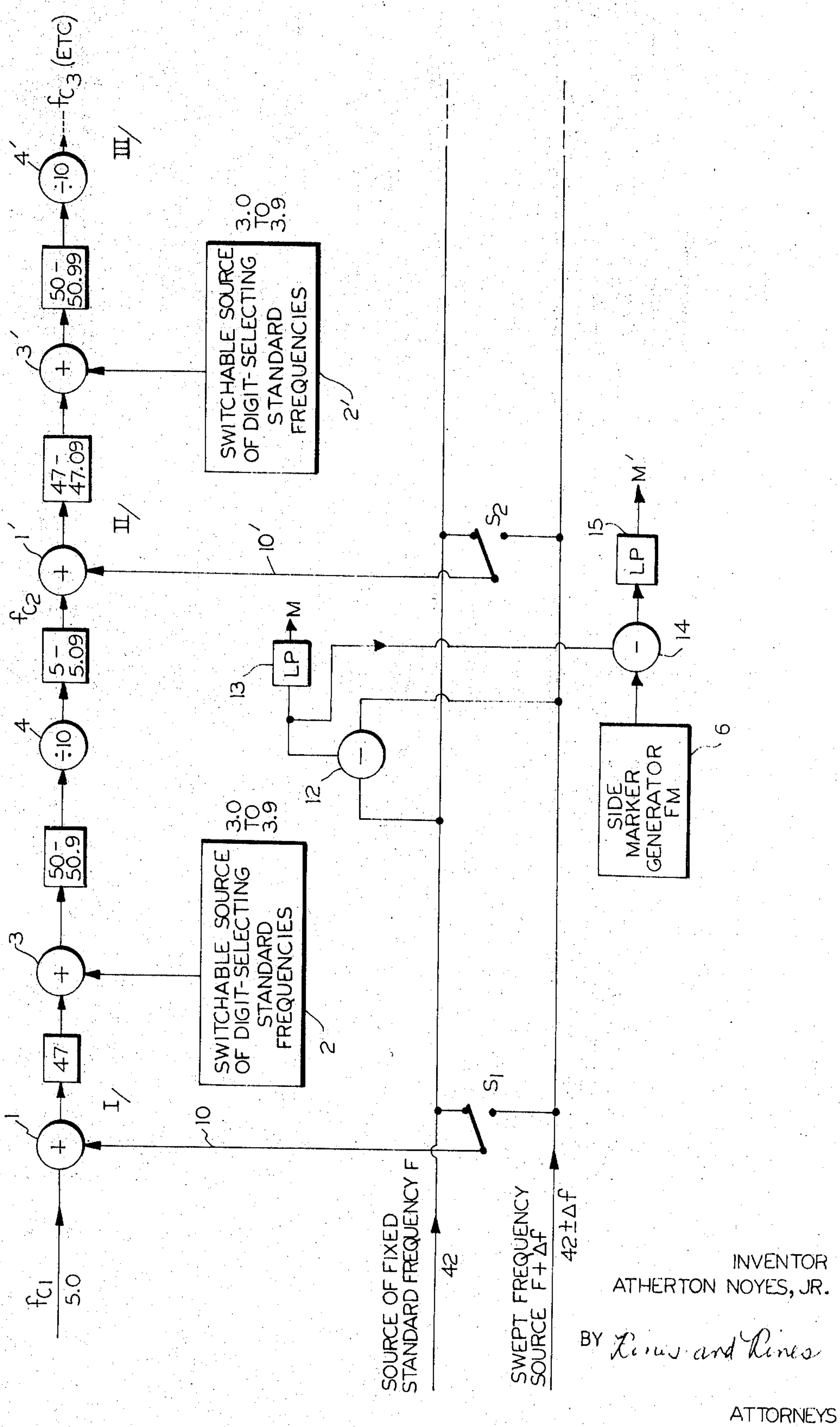
INVENTOR
ATHERTON NOYES, JR.
BY Rines and Rines
ATTORNEYS 3,566,278

SWEPT FREQUENCY SYNTHESIZER WITH FREQUENCY MARKER GENERATION CAPABILITY

Atherton Noyes, Jr., Concord, Mass., assignor to General Radio Company, West Concord, Mass., a corporation of Massachusetts Filed May 31, 1968, Ser. No. 733,600
Int. Cl. H03b *21/02, 23/00*
U.S. Cl. 328—14 9 Claims

ABSTRACT OF THE DISCLOSURE

This disclosure deals with the introduction of frequency sweeps into synthesized signals by apparatus adapted to the generation of frequency markers with synthesizer accuracy. An input signal carrying digit information is added in a first adding means to a fixed standard frequency connected to the adding means through a standard frequency input circuit, the output frequency of the first adding means being added in a second adding means to a step-wise adjustable digit-selecting frequency, thereby to produce a sum frequency in each of a plurality of digit-insertion circuits, the successive sum frequencies of the said circuits being each divided to achieve an output frequency suitable for use as the input signal of the next successive digit-insertion circuit. A periodically vary swept frequency signal centered about the standard frequency is selectively switched to replace the fixed standard frequency signal in any of the digit-insertion circuits, and beat detector means connected to the standard-frequency source and the swept-frequency source produces marker outputs.

The present invention relates to frequency synthesizers, being more particularly directed to "add-and-divide" synthesizers of the general type described in my prior U.S. Letters Pat. No. 3,300,731, issued Jan. 24, 1967, in which frequency synthesis is achieved by adding, successively, one or more fixed frequencies and a step-wise adjustable digit-selecting frequency to an input signal carrying digit information from earlier digit insertion units to produce a sum frequency that is then divided by a number suitable to reduce the rank of the input digit information to be consistent with the rank of the newly inserted digit information, and thus simultaneously to create an output frequency appropriate to serve as the input frequency of the next succeeding digit insertion unit circuit. In the referenced patent, the synthesized frequency passing in sequence through a train of "digit insertion units" is returned, by this frequency division, to approximately the same frequency level at the input to each digit-insertion unit. If we define this frequency in terms of two components, a relatively large, fixed, "carrier" component and a small "signal" component, the system of the referenced patent may be said to be "carrier repeating." While the present invention is particularly applicable to carrier-repeating systems, carrier repetition is not an essential requirement. More specifically, the invention is concerned with the inrtoducing of frequency sweeps, ranging from narrow to wide, into the synthesized signals and for producing frequency markers with synthetsizer accuracy.

A satisfactory technique for so generating frequency markers is disclosed in said patent, wherein means are disclosed for introducing a frequency-swept signal at any chosen rank in the iterative add-and-divide synthesizer and for comparing such frequency-swept signal in frequency with the synthesized portions of the signal established by the digit-insertion units of rank below the insertion point, thus to generate accurate frequency markers.

In particular, in the circuits of said patent, means are provided for disconnecting the output signal, after division, from the input to succeeding circuits, substituting a sweepable input frequency, and comparing in a beat detector the sweepable input frequency with the synthesized signal it has replaced. In this manner, whenever the sweepable input signal becomes instantaneously equal to the disconnected synthesized signal frequency, zero beat occurs in the beat detector, and a marker, for display on an oscilloscope or other output device, can therefrom be generated. The instant in time at which the swept signal reaches equality with the replaced synthesized signal is dependent on the value of the replaced synthesized frequency. Consequently, in an oscilloscope or other display, in which the time base is directly related to the swept signal, the marker will move on the time axis of the display if the value of the replaced synthesized signal is changed.

There are occasions, however, where this shifting of the marker on the time axis is undesirable. While circuits may be constructed to compensate for such shift in the swept-frequency range, as by providing an additional fixed frequency-control input to the source of the swept frequency, such compensating circuits are somewhat complex and costly.

In accordance with the present invention, on the other hand, the desired result in an equivalent sweep performance, including marker generation capability, is achieved not only without this objectionable shift in marker position, but by simplified circuits in which the center frequency of the frequency-swept source is not required to be changed, and the normal course of the signal through the add-and-divide circuits of the synthesizer need not be interrupted by switching.

An object of the invention, accordingly, is to provide a new and improved frequency synthesizer in the "add-and-divide" class wherein, in summary, a fixed standard frequency input to the adding means of any one of the digit insertion units may selectively be switched to a swept-frequency input centered about the standard frequency and to generate the desired marker in a zero beat detector comparing such swept frequency with the fixed standard frequency.

A further object is to provide novel frequency marker generation that is of broader utility and application, as well.

Other and further objects will be explained hereiafter and are more particularly delineated in the appended claims.

The invention will now be described wtih reference to the accompanying drawing, the single figure of which is a combined block and schematic diagram illustrating the invention in preferred form.

Referring to the drawing, an input carrier signal $f_{c_1}$ is shown applied to a first adding circuit 1 of a first digit insertion unit I. The adder 1 has a second input circuit 10 for applying a fixed standard frequency from the source F to produce a first sum frequency which is then added to the step-wise adjustable output of a digit-frequency source 2 in a second adder 3. This produces a second sum frequency that, in turn, is divided by an appropriate division at 4, to produce an output $f_{c_2}$ that may serve as the input signal of the next digit insertion circuit II; all as described in said patent.

For purposes of simplicity of explanation, this operation may be described with reference to a particular example of preferred frequencies for a practical frequency synthesizer, such frequencies being indicated by numerals in the drawing that are intended to represent mHz. units;

though, of course, it is to be understood that other frequencies and frequency ranges may also be employed. Thus, the input signal carrier $f_{c_1}$ to the first digit insertion unit circuit I is indicated as 5.0 (representing 5.0 mHz.); the fixed frequency standard source F, as 42 mHz., applied along input 10 through switch $S_1$ to adder 1; the output of the adder 1, selected by a filter, as 47 mHz.; the digit frequency source 2, as having ten 100 kHz. adjustable steps from 3.0 to 3.9 mHz. in the same fashion described in my prior patent, above referenced; the resulting selected second sum frequency at the output of 3, as 50–51 mHz.; and the divider circuit 4, as a 1/10 divider, to provide an output (that serves as the repeating carrier input $f_{c_2}$ of the next successive digit insertion unit circuit II), of 5–5.09 mHz., in this illustrative example.

In the second digit insertion unit circuit II, the input signal $f_{c_2}$ is add at 1' to another output of the fixed frequency source F, connected through switch $S_2$, from the illustrative 42 mHz. fixed standard frequency source. In adder 1' a first sum frequency of 47–47.09 mHz. is thus generated. This sum frequency, in turn, is mixed with the output of an adjustable ten 100 kHz.-step digit-frequency source 2' in adder 3', to produce a second selected sum frequency lying between 50 and 51 mHz. Division at 4' by a factor of ten produces an output $f_{c_3}$ that may serve as a repeating-carrier input signal of 5–5.1 mHz. for the next successive digit insertion unit circuit III; and so on, for the remaining circuits of the synthesizer, the ultimate output of which may be utilized in any desired manner.

In accordance with the present invention, a periodically swept frequency generator or a frequency modulator is centered about the fixed standard frequency of the source F to produce a swept or frequency-modulated frequency $F\pm\Delta f$ 42 mHz.$\pm\Delta f$ in the above example). If any of switches $S_1$, $S_2$ . . . associated with the respective input circuits 10, 10' . . . of adders 1, 1' . . . of successive digit insertion unit circuits I, II . . ., is selectively switched to its lower position in the drawing, connection is made to the common output from the swept frequency generator $F\pm\Delta f$. The synthesizer output frequency will then be varied by an amount dependent upon the magnitude of $\Delta f$ and upon the particular switch $S_1$, $S_2$ . . . that has been so switched. By connecting a zero beat detector consisting of mixer 12 and low-pass filter 13 between the outputs of the fixed frequency source F and the swept frequency source $F\pm\Delta f$, a marker will be created (by zero beat) whenever the sweeping frequency becomes equal to the fixed frequency F (42 mHz in the above illustration). (The low-frequency output of 13, occurring close to zero beat may, of course, be rectified to produce a DC marker signal, if desired.) It will be observed, moreover, that when this coincidence in frequency occurs, the synthesizer frequency is exactly equal to that called for by the normal digit-selecting circuits of the complete synthesizer. Since the marker output M of the detector 12 always occurs when the swept signal equals the fixed frequency signal, it does not move on the oscilloscope or other synthesizer output display at M as the synthesizer dials or other digit-selecting circuits are changed. As the insertion point of the swept frequency is changed, as by selecting the different switching points $S_1$, $S_2$ . . . , the frequency width of the sweep (at the final synthesizer output) will also change. In the "carrier-repeating" system shown in the figure, or in the referenced patent, the excursion of the synthesizer output frequency resulting from a fixed input excursion $\Delta f$ will change by a factor of 10 when $S_2$ is actuated instead of $S_1$. Additional factors of ten, of course, are introduced by higher rank switches, not shown. Thus, without other adjustments or re-setting, operation with sweeps varying from zero (or very narrow) to broad or wide limits, may be employed, all automatically centered on the synthesized frequency.

Furthermore, when the beat from mixer 12 is not zero, it is a measure of the departure of the actual synthesized frequency from the frequency defined by the digit-setting controls. So, as shown in the figure, it is possible to create additional markers, each side of the center-frequency marker, by comparing the beat frequency with an auxiliary side-marker generator 6, in an additional narrow-band zero-beat detector 14 and 15. The spacing of the side markers from center, in Hz., for any given value of side-marker generator frequency, is directly related to the particular switch $S_1$, $S_2$, . . . that has been actuated. The position of the side-markers on the display, however, is determined only by the frequency from side-marker generator 6, and independent of $S_1$, $S_2$ . . .

That is, for a fixed deflection voltage to the scope or other display device, and a fixed side-marker generator frequency, the position of the markers on the display will be independent of which switch $S_1$, $S_2$ . . . is actuated, and also independent of the frequency called for by the digit-selecting controls. It is, therefore, easy to move the synthesized center frequency, at will, to any frequency within the range of the synthesizer (by the digit-selecting controls) and to choose any desired sweep width (by actuation of switches $S_1$, $S_2$ . . .) without disturbing the display or the position of the markers on the display. The center-frequency marker always indicates the exact synthesized center frequency; the side-marker spacing can represent wide or narrow frequency deviation, as chosen by $S_1$, $S_2$, . . . and the frequency delivered by the side-marker generator.

Of course, the frequency from the side-marker generator need not be fixed; it can be set or programmed to a series of different values, if desired, to produce additional side-marker pairs.

It is thus apparent that since in any "add and divide" synthesizer one of the fixed-frequency inputs to each digit-insertion circuit group can always be established at a single value of frequency, it is easy to introduce a sweeping frequency or a frequency-modulated signal to replace this input, at whatever rank may be chosen, even without regard for the fact that the main synthesizer train may not be "carrier repeating," as in the system of my said prior patent.

For example, in a copending application, Ser. No. 733,-592, Frequency Synthesizer Apparatus, filed May 31, 1968, now Pat. No. 3,509,483, a synthesizer is described in which the carrier is not "repeating" and in which not one decade of digits, but three or four or more decades (1,000 or 10,000 separate frequency steps) are inserted at a single adding point similar to 3 and 3' of the figure. The present invention is particularly advantageous in such a system. The sweep and marker methods of the referenced patent are easily applicable to "carrier repeating" systems, but unlike the methods of the present invention, require additional complexity when the carrier changes at the several digit-insertion points.

It is, of course, evident that the technique of the present invention is applicable, no matter what the source may be of the frequencies representing digit information to be inserted at each digit adding point. Such frequencies may come from a digit oscillator, as in the referenced patent, or, as another example, from a cross-bar switch matrix, selecting from a set of continuously-generated digit frequencies.

Further modifications will also occur to those skilled in this art, and all such are considered to fall within the spirit and scope of the invention as defined in the appended claims.

What is claimed is:

1. In a frequency synthesizer in which an input signal carrying digit information and connected to a first adding means is added to a fixed standard frequency from standard frequency source means connected through a standard-frequency input circuit to said first adding means, and in which the output frequency of the said first adding means is added in a second adding means to a step-wise adjustable digit-selecting frequency, thereby to produce a sum frequency in each of a plurality of digit-insertion circuits, the successive sum frequencies of the said circuits being each divided to achieve an output frequency suitable for use as the said input signal of the next successive digit-inseriton circuit, the combination of source means providing a periodically varying swept frequency sgnal centered about said standard frequency, switching means for connecting said swept frequency signal source means to said standard-frequency input circuit to replace said fixed standard frequency signal, selectively, in said plurality of digit-insertion circuits, and beat detector means connected to both said standard-frequency source means and said swept-frequency source means for producing marker outputs for synthesizer frequency display.

2. Frequency-sweeping means as claimed in claim 1, and in which the beat detector is a zero-beat detector for synthesizer center-frequency display.

3. Frequency-sweeping means as claimed in claim 2, plus means for detecting beat frequencies other than zero for producing additional marker outputs at predetermined ogsets from synthesizer center frequency.

4. In a frequency synthesizer in which an input signal carrying digit information and connected to a first adding means is added to a fixed standard frequency from standard frequency source means connected through a standard-frequency input circuit to said first adding means, and in which the output frequency of the said first adding means is added in a second adding means to a step-wise adjustable digit-selecting frequency, thereby to produce a sum frequency in each of a plurality of digit-insertion circuits, the successive sum frequencies of the said circuits being each divided to achieve an output frequency suitable for use as the said input signal of the next successive digit-insertion circuit, the combination of source means providing a periodically varying swept frequency signal centered about said standard frequency, and switching means for connecting said swept frequency signal source means to said standard-frequency input circuit to replace said fixed standard frequency signal, selectively, in said plurality of digit-insertion circuits.

5. In a frequency synthesizer in which fixed and step-wise adjustable digit-selecting frequencies are added in adding means to an input signals carrying digit information to produce a sum frequency in a plurality of successive digit insertion circuits, the successive sum frequencies of the said circuits being each divided to achieve the appropriate digit rank and thus to provide an output frequency suitable for use as the said input signal of the next successive circuit, the combination of a plurality of input crcuits, one connected to each of the adding means in said successive digit insertion circuits; fixed standard frequency source means; means for generatng a periodically swept frequency centered about the standard frequency of said source means; selectively adjustable means for connecting any one of said input circuits selectively to said source means and said swept frequency generating means; and beat detector means connected to both said source means and said swept frequency generating means for producing a marker output for synthesizer frequency display.

6. A frequency synthesizer as claimed in claim 5 and in which said selectively adjustable means comprises a plurality of switching means, one corresponding to each input circuit and adapted to switch between a common output from said source means and a common output from said swept frequency generating means.

7. A frequency synthesizer as claimed in claim 6 and in which the said beat detector means comprises zero beat detecting means connected between said common outputs.

8. In a frequency synthesizer in which adding means is employed to add an input signal to other frequency inputs, the combination of fixed standard frequency source means, means for generating a periodically swept frequency centered about the standard frequency of said source means, selectively adjustable means for connecting said adding means selectively to said source means and said swept frequency generating means, and beat detector means connected to both said source means and said swept frequency generating means for producing a marker output.

9. In a frequency synthesizer in which an input signal carrying digit information and connected to a first adding means is added to a fixed standard frequency from standard frequency means connected through a standard-frequency input circuit to said first adding means, and in which the output frequency of the said first adding means is added in a second adding means to a step-wise adjustable digit-selecting frequency, thereby to produce a sum frequency in each of a plurality of digit-insertion circuits, the successive sum frequencies of the said circuits being each divided to achieve an output frequency suitable for use as the said input signal of the next successive digit-insertion circuit, the combination of source means providing a periodically varying swept frequency signal centered about said standard frequency, and switching means for connecting said swept frequency signal source means to said standard-frequency input circuit to replace said fixed standard frequency signal, selectively, in said plurality of digit-insertion circuits.

References Cited

UNITED STATES PATENTS

| | | | |
|---|---|---|---|
| 3,017,579 | 1/1962 | Brack | 331—38 |
| 3,227,963 | 1/1966 | Dimmick | 331—38X |
| 3,283,254 | 11/1966 | Haynie | 328—48X |
| 3,300,731 | 1/1967 | Noyes | 331—2 |
| 3,331,035 | 7/1967 | Strickholm | 328—14X |
| 3,372,346 | 3/1968 | Rogers et al. | 331—38X |

JOHN S. HEYMAN, Primary Examiner

U.S. Cl. X.R.

328—48, 158; 331—2, 38